H. DURHAM.
GASOLENE DISPENSING APPARATUS.
APPLICATION FILED JAN. 31, 1920.

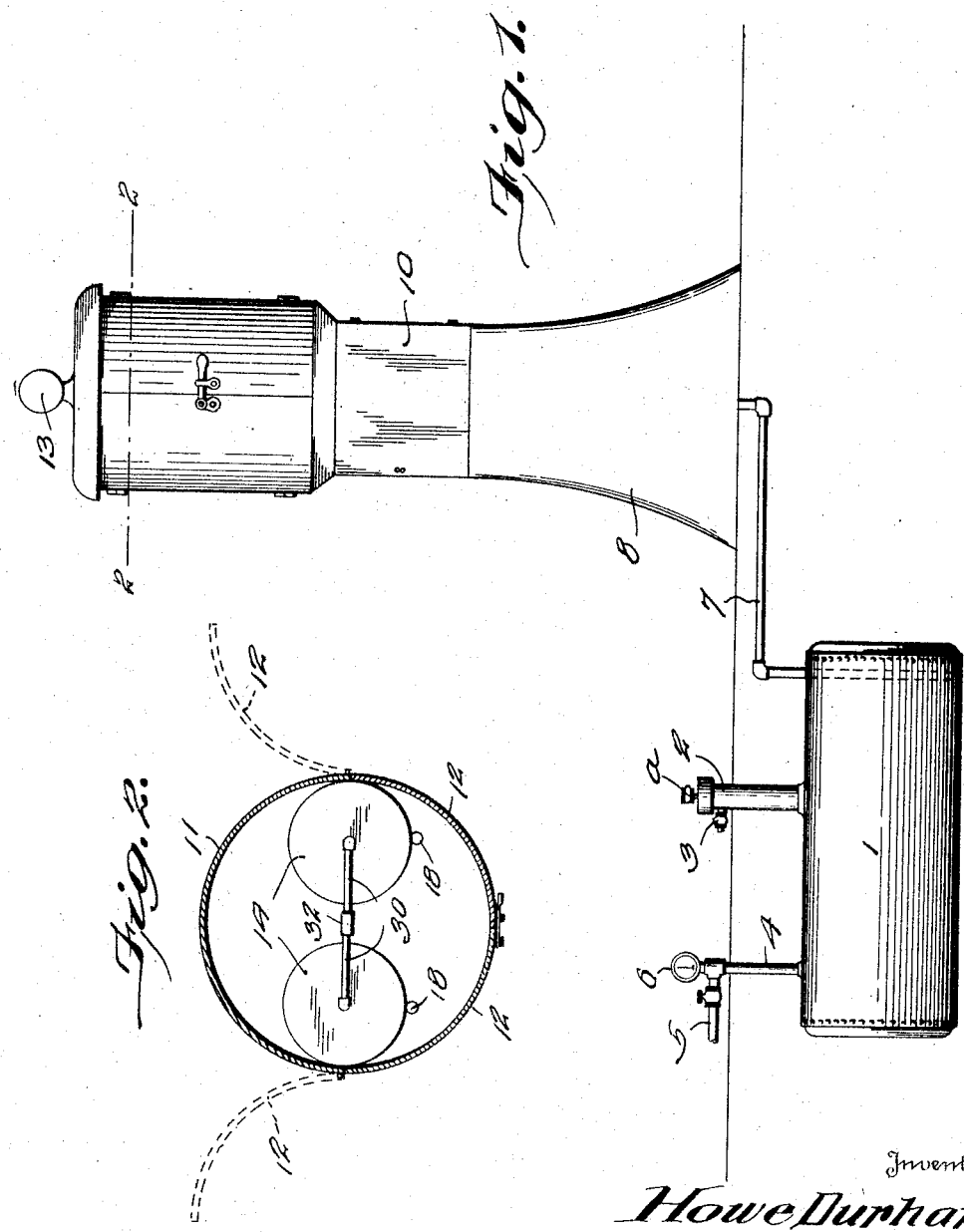

1,365,160.

Patented Jan. 11, 1921.
2 SHEETS—SHEET 2.

Inventor
Howe Durham

UNITED STATES PATENT OFFICE.

HOWE DURHAM, OF SHELLMAN, GEORGIA.

GASOLENE-DISPENSING APPARATUS.

1,365,160.  Specification of Letters Patent.  Patented Jan. 11, 1921.

Application filed January 31, 1920. Serial No. 355,323.

*To all whom it may concern:*

Be it known that I, HOWE DURHAM, a citizen of the United States, residing at Shellman, in the county of Randolph, State of Georgia, have invented certain new and useful Improvements in Gasolene-Dispensing Apparatus, of which the following is a specification.

All gasolene dispensing apparatus, with which I am familiar, necessitate the use of manual labor to pump the gasolene from the ground tank to the delivery tank or hose and necessarily the pumping action is more or less slow. Many of the pumps in use are of such construction that a boy cannot operate them.

One of the objects of my invention is to provide a gasolene dispensing apparatus in which the gasolene will be raised to the measuring tank or delivery hose by means of pressure, such for instance as compressed air in the under ground gasolene tank so that by the simple operation of opening a valve the gasolene is raised from the under ground tank and delivered to the measuring tank or delivery hose.

A further object of my invention is to provide means in a dispensing apparatus whereby the flow of gasolene to measuring tanks is automatically stopped when the gasolene has reached a pre-determined height in the measuring tanks.

A further object of my invention is to provide means whereby when a valve is opened to deliver gasolene from the measuring tanks to an automobile atmospheric pressure is automatically admitted in the top of the measuring tanks.

A further object of my invention is to provide means whereby the valve in the supply pipe from the under ground tank is closed just before the flow of gasolene from the measuring tank commences: and with these and other objects in view my invention consists of the parts and combination of parts as will be hereinafter more fully set out.

In the drawing.

Figure 1 is a side elevation of a dispensing apparatus constructed in accordance with my invention.

Fig. 2 is an enlarged detail sectional view on the line 2—2 Fig. 1 the doors being shown open on dotted lines.

Figure 3:
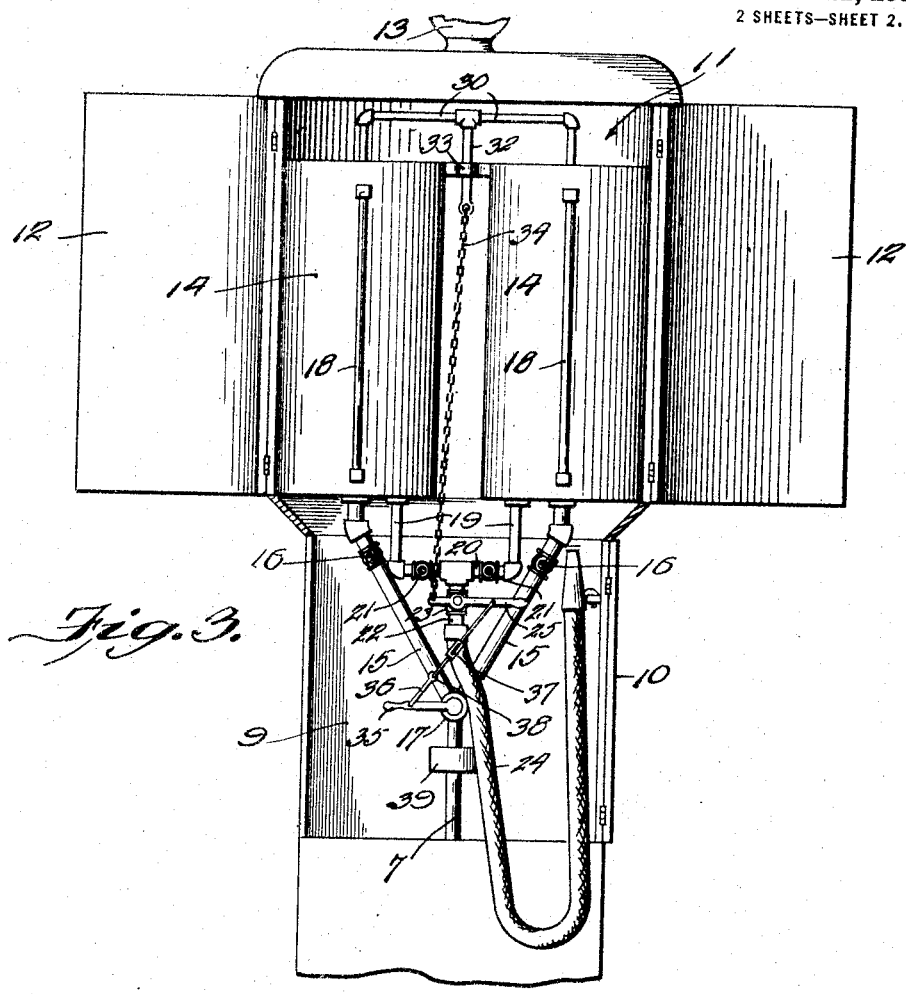
Fig. 3 is an enlarged detail front elevation of the upper portion of the dispensing apparatus, parts being in section and the doors of the several chambers being shown in open position.
Figure 4:
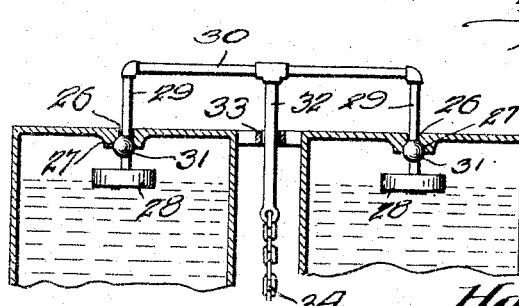
Fig. 4 is an enlarged detail sectional view at the top of the measuring tanks.

The reference numeral 1 designatees an under ground gasolene supply tank having the usual filling pipe 2 which pipe is provided with a pet cock 3. 4 is another pipe connected with the tank 1 which is in valved communication with the pipe 5 leading to a source of compressed air which may be either a tank or a foot pump. 6 is a pressure gage in open communication with the pipe 4 and the tank 1. 7 is a gasolene pipe leading from the tank 1 to the measuring tanks to be hereinafter referred to.

The casing for my improved apparatus positioned above the ground level comprises a base 8, an intermediate chamber 9 provided with a door 10, and an upper chamber 11 provided with doors 12. Preferably there is a light dome 13 on top of the casing.

Within the chamber 11 I suitably mount measuring tanks 14 which are of equal capacity and of any desired size. These measuring tanks are connected to the gasolene supply pipe 7 by means of branch pipes 15 provided with valves 16, there being a main valve 17 in the pipe 7. The object of providing the pipes 15 with a valve 16 is to enable me to cut off the flow of gasolene from either tank in the event of one of the tanks becoming damaged. The tanks are provided with a suitable sight measuring gage 18.

Leading from the bottom of each measuring tank is a pipe 19 which pipes are connected at their lower ends to a pipe 20, said pipe 20 being provided with valves 21 whereby the flow of gasolene from either tank 14 may be controlled independently of the flow from the other tanks. The pipe 20 is provided with a delivery nozzle 22 having a valve 23, a suitable delivery hose 24 being connected with the nozzle 22. The valve 23 is provided with an elongated handle 25 the ends of which project beyond each side of the valve proper as illustrated in the drawing.

The top of each measuring tank 14 is provided with an aperture 26 below which is formed a valve seat 27. 28 designates suitable floats within the tanks 14 provided with stems 29 projecting through the apertures 26, said stems 29 being connected by a rod 30. Each float stem is provided with a ball valve 31 adapted to seat on the valve seat 27. The rod 30 is provided at its center with a depending stem 32 which is, preferably, positioned between the measuring tanks 14 and slides in a guide 33 with a very loose fit. 34 is a chain one end of which is connected to the lower end of the stem 32 while the other end is connected to one end of the valve lever or handle 25.

The valve handle 35 of the valve 17 is connected to the valve handle 25 of the valve 23 for simultaneous movements by means of a rod 36 said rod being provided with a turn-buckle 37 and with a flexible joint 38.

In operation, the valves 17 and 16 being opened, and a suitable pressure in the tank 1, gasolene is forced by the pressure in the tank 1 upwardly through the pipe 7 into the measuring tanks 14 and continues to flow in said measuring tanks until the ball valve 3 is seated on the seat 27 by the rising of the float 28 whereupon the flow of gasolene is checked. The valve 17 is now closed. In this connection it will be noted that the valve 17 may be operated manually independently of the valve 23 by reason of the fact that there is a flexible joint 38 and the rod 36, whereby the rod 36 may be flexed after the manner of a chain.

When it is desired to deliver gasolene to an automobile the delivery hose 24 is introduced into the gasolene tank of the automobile and the valve handle 25 operated to open the valve 23. To open the valve 23 the valve handle 25 is moved upwardly, whereby the chain 34 is pulled downwardly, thus moving the rod 30 downwardly and unseating the ball valves 31 whereby atmospheric pressure is admitted into the measuring tanks 14, whereupon the gasolene is free to flow through the pipes 19 and 20 into the delivery hose 24 and thus to the supply tank of the automobile, the flow of gasolene being simultaneous from both tanks so that a large amount of gasolene may be delivered to an automobile on one operation shown in my improved apparatus.

It frequently occurs that the operator of the gasolene tank forgets to close off the supply of gasolene prior to opening the flow of gasolene from the measuring tanks to the automobile whereby an excess amount of gasolene is delivered to the automobile at a loss to the dealer. To prevent such loss I connect the valve 17 on the main supply pipe 7 with the valve 23 on the delivery pipe by means of the rod 36 so that when the handle 25 of the valve is pulled upwardly the handle 35 is moved upwardly thereby closing the valve 17 just prior to the opening of the valve 23. The turn-buckle 37 permits of adjustments of the length of the rod 36, while the flexible joint 38 permits of the rod 36 being flexed so that the handle 35 of the valve 17 may be operated without communicating movement through the rod 36 to the handle 25 of the valve 23.

I install a meter 39 in the supply pipe 7 so that the dealer may keep an accurate account of the number of gallons of gasolene pumped into the machine.

When it is necessary to fill the under ground tank the pet cock 3 is opened so as to release the pressure in the tank thereby permitting the ready inflow of the gasolene to the under ground tank.

Many changes may be made in the details of construction and arrangement within the scope of the appended claims.

What I claim is:—

1. In a dispensing device of the character described, the combination with a supply tank, a measuring tank suitably connected with said supply tank, a delivery pipe connected with the measuring tank and provided with a valve, a float in said measuring tank having a stem projecting through an aperture in the top of the measuring tank, a ball valve carried by the stem of the float and adapted to close the aperture in the top of the tank, and means connecting the float stem with the valve of the delivery pipe, whereby when the valve is opened to permit the flow of liquid through the delivery pipe the float is depressed and the ball unseated from said aperture.

2. In a liquid dispensing apparatus, the combination with a measuring tank having an aperture in its top, a delivery pipe leading from said tank and provided with a valve, of a float mounted in said tank and provided with a stem projecting through the aperture in the top of the tank, a ball valve on said float stem adapted to close the aperture when the float has reached its uppermost pre-determined position, means connecting the float stem with the valve of the delivery pipe, whereby when the valve is moved to open position the said stem, ball and float are depressed thereby opening the aperture in the top of the tank.

3. In a liquid dispensing device the combination with a measuring tank having an aperture through its top, a delivery pipe leading from said tank and provided with a valve, of a float mounted in said tank and provided with a stem projecting through said aperture in the top of the tank, a ball valve rigidly secured to said stem and adapted to close said aperture when the float has reached its uppermost pre-determined position, a flexible connection between the stem of the float and the valve of the delivery pipe operated by the opening of the said valve of the delivery pipe whereby when the valve of the delivery pipe is opened the said ball is depressed within the tank thereby opening the aperture in the top of the tank, and whereby the valve of the delivery pipe may be closed without moving the ball valve.

4. In a liquid dispensing device the combination with a supply tank and a supply pipe leading therefrom, means to inject air pressure in said supply tank, a meter in said supply pipe and a valve to control the flow of liquid through said supply pipe, of a plurality of measuring tanks connected with said supply pipe whereby the liquid may be delivered by said supply pipe simultaneously to all of the measuring tanks, a single delivery pipe having branched connection with all of the measuring tanks, a valve in said delivery pipe, an aperture in the top of each of the delivery tanks, a float in each of the delivery tanks having a stem projecting through the said apertures, a ball valve carried by each of said stems to close said apertures when the floats have reached their uppermost pre-determined position, means connecting the upper ends of said float stems outside of the measuring tanks for simultaneous movement of the stems, and a flexible connection between said means and the valve of the delivery pipe whereby the valve in moving to open position depresses said stems simultaneously and unseats the balls from the apertures, and whereby the valve of the delivery pipe may be closed without disturbing the ball valves of the floats in their open position.

In testimony whereof I affix my signature.

HOWE DURHAM.